(12) United States Patent
Shibata et al.

(10) Patent No.: US 7,899,960 B2
(45) Date of Patent: Mar. 1, 2011

(54) HOST DEVICE

(75) Inventors: Osamu Shibata, Hyogo (JP); Hiroshi Suenaga, Osaka (JP); Yoshiyuki Saito, Osaka (JP)

(73) Assignee: Panasonic Corporation, Osaka (JP)

( * ) Notice: Subject to any disclaimer, the term of this patent is extended or adjusted under 35 U.S.C. 154(b) by 203 days.

(21) Appl. No.: 12/402,016

(22) Filed: Mar. 11, 2009

(65) Prior Publication Data
US 2009/0233489 A1 Sep. 17, 2009

(30) Foreign Application Priority Data
Mar. 14, 2008 (JP) .............................. 2008-065150

(51) Int. Cl.
*G06F 13/12* (2006.01)
*G06F 13/38* (2006.01)
(52) U.S. Cl. ........................................ 710/74; 713/400
(58) Field of Classification Search .................. None
See application file for complete search history.

(56) References Cited

U.S. PATENT DOCUMENTS

| | | | | |
|---|---|---|---|---|
| 6,791,987 | B1 * | 9/2004 | Eng et al. .............. | 370/395.62 |
| 6,810,484 | B2 * | 10/2004 | Govindaraman ............ | 713/400 |
| 2003/0063627 | A1 * | 4/2003 | Toshitani ..................... | 370/503 |
| 2004/0030830 | A1 * | 2/2004 | Shimizu ...................... | 711/115 |
| 2010/0049878 | A1 * | 2/2010 | Yu et al. ...................... | 710/11 |

FOREIGN PATENT DOCUMENTS

| | | |
|---|---|---|
| JP | 2000-347993 | 12/2000 |
| JP | 2008-021038 | 1/2008 |

* cited by examiner

*Primary Examiner*—Henry W Tsai
*Assistant Examiner*—Elias Mamo
(74) *Attorney, Agent, or Firm*—McDermott Will & Emery LLP

(57) ABSTRACT

A card controller receives data from a recording card via a socket. A read clock is transmitted in a main transmission wiring, and the data is transmitted in a data transmission wiring. The read clock is withdrawn from the card controller by an outgoing transmission wiring and retrieved into the card controller by an incoming transmission wiring. A transmission delay amount of the outgoing transmission wiring is equal to that of the main transmission wiring, and a transmission delay amount of the incoming transmission wiring is equal to that of the data transmission wiring. The card controller receives the data in synchronization with the read clock retrieved by the incoming transmission wiring.

9 Claims, 12 Drawing Sheets

F I G. 1 1
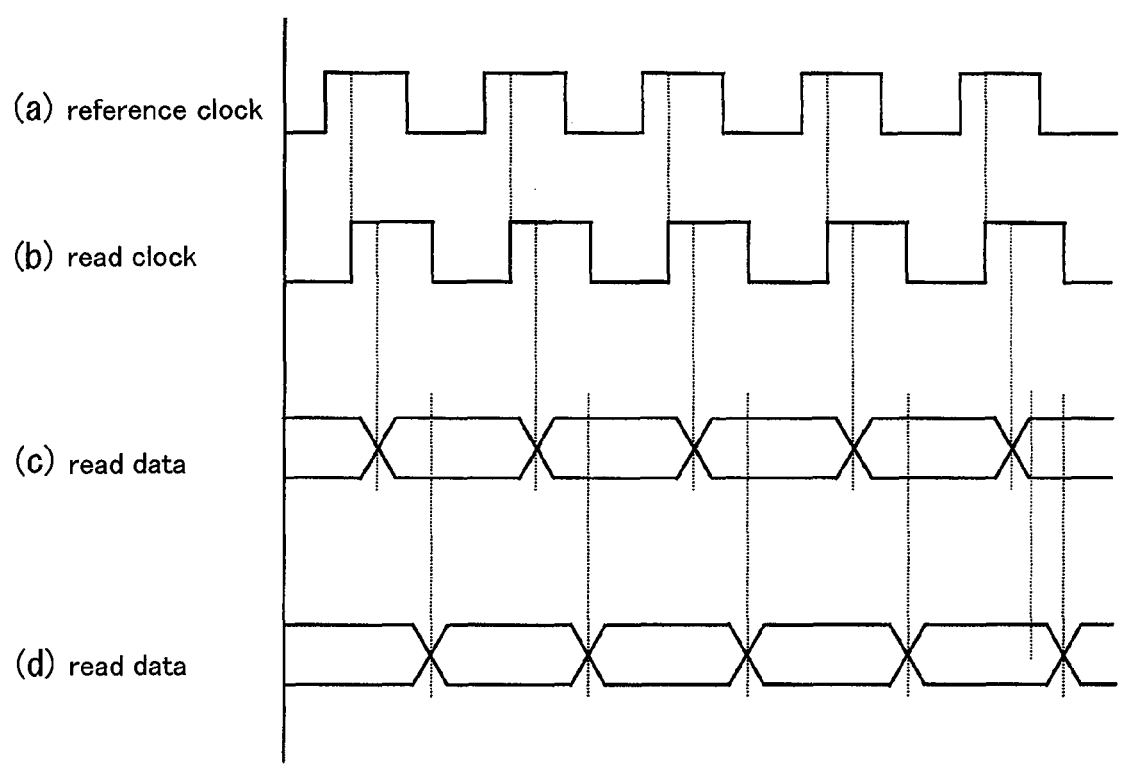

F I G. 1 2
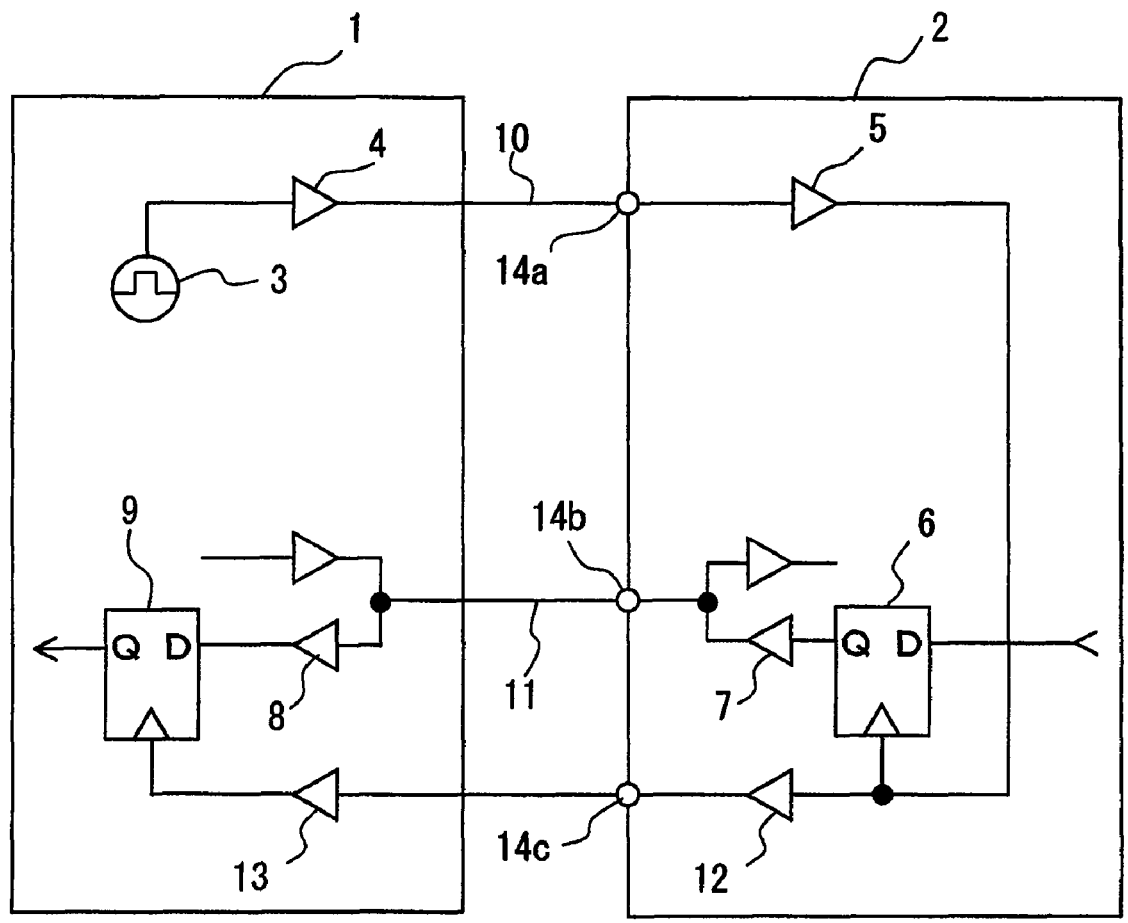

F I G. 1 3
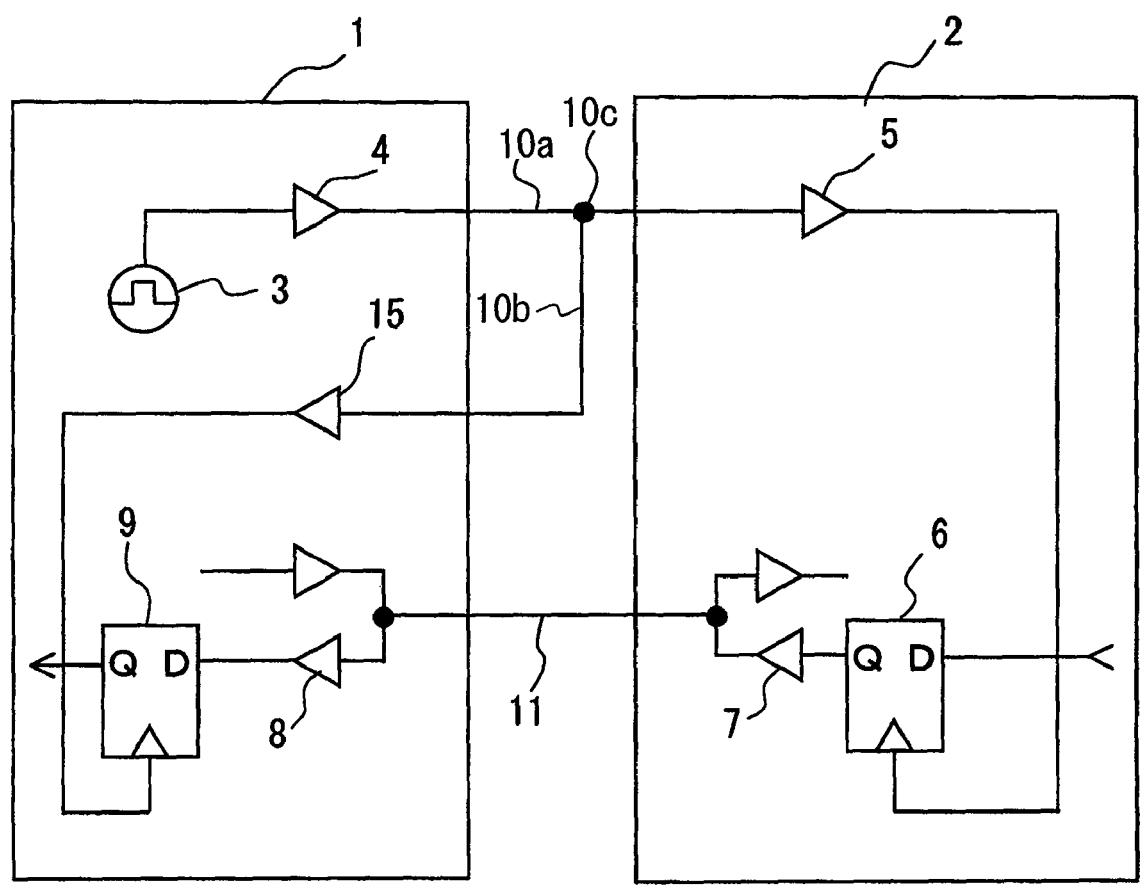

HOST DEVICE

BACKGROUND OF THE INVENTION

1. Field of the Invention

The present invention relates to a card interface technology relating to a host device applicable to various cards such as a SD (Secure Digital) card.

2. Description of the Related Art

Some digital devices are provided with a recording function and a reproducing function for various contents data, for example, audio, music, still image, moving image and the like. Hereinafter, the digital device thus constituted is referred to as a host device. Examples of the host device are a digital video camera, digital camera, laptop personal computer (PC), PDA (Personal Digital Assistants), mobile telephone, digital television, DVD recorder, DVD player, printer, copying machine, and the like.

There are an increasing number of host devices provided with a card interface which allows various contents data to be read from and written in a detachable small-size recording medium. As the digital device is increasingly miniaturized in recent years, the small-size recording medium installed therein is also increasingly miniaturized. As a result, a generally called memory card in which a semiconductor memory is used as a recording medium further miniaturized is often adopted today. Among all of the memory cards thus constituted, a large number of SD cards in compliance with the SD standards have been made commercially available as a memory card which supports the protection of a copyright. The SD card is a memory device in which information is memorized in a semiconductor memory chip provided therein. The SD card directly and electrically accesses a nonvolatile memory formed in the semiconductor memory chip to read data therefrom and write data therein. The SD card, which is thus free of any mechanical control, can write and read data faster than other memory devices and has a size and a weight which are relatively small.

Referring to FIG. 10, the host device which reads data from the SD card thus constituted is described. A host device 1 comprises a reference clock generator 3, and sends a reference clock generated by the reference clock generator 3 to a SD card 2 via a buffer (driver) 4 as a read clock. In response to the input of the read clock to a clock input terminal of a D flip-flop 6 via a buffer (receiver) 5, the SD card 2 sends data inputted to an input terminal D of the D flip-flop 6 (read data) to a buffer 8 of the host device 1 via an output terminal Q and a buffer 7. In the host device 1, the data is inputted to a data input terminal D of a D flip-flop 9, and the read clock of the reference clock generator 3 is inputted to a clock input terminal of the D flip-flop 9. Accordingly, the data is thereby outputted from an output terminal Q of the D flip-flop 9.

In the data transmission mode described above, wherein the read clock and the data are transmitted between the host device 1 and the SD card 2 via a clock transmission wiring 10 and a data transmission wiring 11, a phase shift generated between the read clock and the data becomes a problem.

The phase shift is described referring to FIG. 11. FIG. 11a) illustrates a waveform of a reference clock A of the reference clock generator 3. FIG. 11b) illustrates a read clock delayed by an arbitrary phase shift (clock skew) in comparison to the reference clock generated when the read clock was transmitted in the clock transmission wiring 10. FIG. 11c) illustrates data outputted to the data output terminal Q of the D flip-lop 6 of the SD card 2 based on the read clock. FIG. 11d) illustrates data delayed by an arbitrary phase shift generated when the data was transmitted in the data transmission wiring 11.

When these phase shifts are generated in the read clock and the data, it becomes impossible to read the data from the SD card 2 at a high speed.

There are conventional technical ideas which were proposed to avoid such an inconvenience, which are a source synchronous system and a common clock turn-around system. The source synchronous system is recited in No. 2000-347993 of the Japanese Patent Applications Laid-Open, and the common clock turn-around system is recited in No. 2008-21038 of the Japanese Patent Applications Laid-Open.

The source synchronous system is described below referring to FIG. 12. According to the source synchronous system, when a host device 1, as a transmitter side, transmits data and a source clock in the same transmission path, a SD card 2, as a receiver side, uses the source clock transmitted thereto as a read clock, and transfers the read clock to the host device 1 via a buffer 12 on the SD-card-2 side and a buffer 13 on the host-device-1 side, bringing the read clock into synchronization with a D flip-flop 9 on the host-device side. Accordingly, the variation of a delay time and a clock skew in the transmission path are controlled. As a result, the data can be transferred fast between the host device 1 and the SD card 2.

The common clock system is described below referring to FIG. 13. According to the common clock system, a reference clock is amplified in a buffer 4, and the amplified reference clock is transmitted as a read clock from a transmitter side (host device 1) to a receiver side (SD card 2) via an outgoing transmission wiring 10a, and, in addition, the read clock is fed back to a receiver 15 of the host device 1 through an incoming transmission wiring 10b on the outgoing transmission wiring 10a so that the fed-back clock is used as a clock for a D flip-flop 9 of the host device 1.

In the source synchronous system, however, it is necessary to additionally provide on the SD-card-2 side a pin terminal 14a for transmitting the source clock to the host-device-1 side, a pin terminal 14b for transmitting the data and a pin terminal 14c for transmitting the read clock from the SD card 2 to a card controller 1. As a result, compatibility with other cards is lost.

In the common clock turn-around system, the outgoing transmission wiring 10b branches from the outgoing transmission wiring 10a, and furthermore a circuit configuration thereby obtained is equivalent to a state which seems as if the SD card 2 was connected to a branch point 10c as a capacitor. Therefore, the reflection of signals is generated due to an impedance mismatch at the branch point 10c. The reflection of signal disturbs a waveform of the read clock, which results in the failure of the fast data transmission. It is a possible solution to provide a constitution for realizing the impedance matching on the host-device-1 side: however, impedance varies between the SD card 2 and other cards. Therefore, the constitution may be applicable to the impedance of a particular SD card 2; however, may not be used for the other cards. As a result, connectivity between the cards and the host device is deteriorated.

SUMMARY OF THE INVENTION

Therefore, a main object of the present invention is to make it unnecessary to additionally provide any terminal pins on a card side, prevent a quality of a read clock from deteriorating, and improve connectivity between the card side and a host-device side so that data can be rapidly transmitted with a high quality.

A host device according to the present invention comprises:

a reference clock generator for generating a read clock;

a socket in which a recording card is removably loaded so that a signal can be thereby received and transmitted;

a card controller for transmitting the read clock to the socket and receiving via the socket data transmitted in synchronization with the read clock by the recording card which receives the read clock via the socket;

a clock transmission wiring for transmitting the read clock; and a data transmission wiring for transmitting the data, wherein the clock transmission wiring comprises:

a main transmission wiring for transmitting the read clock from the card controller to the socket;

an outgoing transmission wiring for withdrawing the read clock from the card controller; and an incoming transmission wiring for retrieving the read clock withdrawn from the card controller by the outgoing transmission wiring into the card controller, and a transmission delay amount of the outgoing transmission wiring is set to be equal to that of the main transmission wiring, a transmission delay amount of the incoming transmission wiring is set to be equal to that of the data transmission wiring, and the card controller receives the data transmitted by the recording card in synchronization with the read clock retrieved by the incoming transmission wiring.

Preferably, the card controller comprises a controller first terminal, a controller second terminal, a controller third terminal and a controller fourth terminal, the socket comprises a socket first terminal and a socket second terminal, the main transmission wiring is connected to the controller first terminal and the socket first terminal, the data transmission wiring is connected to the controller second terminal and the socket second terminal, the outgoing transmission wiring is connected to the controller third terminal, and the incoming transmission wiring is connected to the controller fourth terminal.

Preferably, a load regarded as a load of the card controller equal to that of the recording card is connected to a turn-around point between the outgoing transmission wiring and the incoming transmission wiring.

The read clock is not necessarily limited to a clock for reading alone, and may include a clock used for both writing and reading. A position of the turn-around point between the outgoing transmission wiring and the incoming transmission wiring is not particularly limited, and types of the recording card and the load are not particularly limited. The recording card is not limited to a memory device or a memory medium in which data is recorded such as an SD card, and may include a card simply used as an interface device into which data is transmitted from outside. An LSI (integrated circuit device) preferably constitutes the card controller. The socket is not necessarily limited to a device having such an appelation, and the card may be loaded in and removed from the socket in any manner.

In the present invention, a phase shift generated by a time delay of the read clock transmitted from the card controller to the socket is absorbed in the outgoing transmission wiring provided in the host device, and a phase shift generated by a time delay of the data transmitted from the socket to the card controller is absorbed in the incoming transmission path provided in the host device. Further, a phase shift caused in accordance with the load (impedance) of each recording card inserted into the socket is absorbed by the load provided between the outgoing transmission wiring and the incoming transmission wiring. As a result, a skew generated between the clock and the data can be controlled. Thus constituted, the data can be transmitted fast, and it becomes unnecessary to additionally provide any pin terminals for sending the source clock to the host device in the recording card. Further, such problems as the deterioration of a quality of the read clock due to the disturbance of a waveform of the read lock generated in the fast data transmission and the deterioration of connectivity between the cards and the host device can be resolved.

According to a preferable mode of the present invention, a capacitor is used as the load. Accordingly, a pseudo transmission wiring corresponding to the recording card actually used is provided in the host device. Therefore, the quality of the read clock and high-speed data transmission can be improved on the host side regardless of a state of the recording card loaded in the socket.

According to another preferable mode of the present invention, a wiring width at the turn-around point is smaller than a wiring width of the outgoing transmission wiring and a wiring width of the incoming transmission wiring. Accordingly, such a problem as the reflection of signals resulting from an impedance mismatch can be prevented from happening by the load connected to between the outgoing transmission wiring and the incoming transmission wiring.

According to still another preferable mode of the present invention, the main transmission wiring and the outgoing transmission wiring are provided substantially in parallel with each other, and a phase of the read clock transmitted in the main transmission wiring and a phase of the read clock transmitted in the outgoing transmission wiring are shifted in relation to each other through 180 degrees.

Accordingly, a magnetic field generated by a current traveling through the main transmission wiring and a magnetic field generated by a current traveling through the outgoing transmission wiring cancel each other out. As a result, a waveform distortion generated when the read clock is transmitted fast is controlled, and the quality of the read clock is improved, which improves an accuracy of the high-speed data transmission.

According to still another preferable mode of the present invention, the main transmission wiring, the outgoing transmission wiring and the incoming transmission wiring are provided substantially in parallel with one another, and the main transmission wiring is provided between the outgoing transmission wiring and the incoming transmission wiring, and a phase of the read clock transmitted in the main transmission wiring and a phase of the read clock transmitted in the outgoing transmission wiring are shifted in relation to each other through 180 degrees, and the phase of the read clock transmitted in the main transmission wiring and a phase of the read clock transmitted in the incoming transmission wiring are shifted in relation to each other through 180 degrees.

Accordingly, the magnetic field generated by the current traveling through the main transmission wiring and the magnetic field generated by the current traveling through the outgoing transmission wiring cancel each other out, and further, the magnetic field generated by the current traveling through the main transmission wiring and a magnetic field generated by a current traveling through the incoming transmission wiring cancel each other out. As a result, the waveform distortion generated the fast transmission of the read clock is controlled, and the quality of the read clock is improved, which improves the accuracy of the high-speed data transmission.

According to still another preferable mode of the present invention, a connection wiring which connects the outgoing transmission wiring and the incoming transmission wiring to each other is provided at the turn-around point, and a dumping resistor or an inductance is connected to any one of the outgoing transmission wiring, the incoming transmission wiring and the connection wiring.

Accordingly, the waveform distortion of the read clock transmitted in the outgoing transmission wiring and the incoming transmission wiring can be improved.

According to still another preferable mode of the present invention, an SD card is used as the recording card.

According the present invention, the distortion of the waveform of the read clock transmitted in the outgoing transmission wiring and the incoming transmission wiring is controlled, and the quality of the read clock can be significantly improved. As a result, the data reading in which the quality-improved read clock is used can be performed at a high speed. Further, such a highly accurate data reading operation can be realized without additionally providing any terminal pins on the recording-card side.

BRIEF DESCRIPTION OF THE DRAWINGS

These and other objects of the invention will become clear by the following description of preferred embodiments of the invention and be specified in the claims attached hereto. A number of benefits not recited in this specification will come to the attention of the skilled in the art upon the implementation of the present invention.

FIG. 11 is an illustration of an operation timing of the host device illustrated in FIG. 10 according to the source synchronous system.

FIG. 12 is a block circuit diagram illustrating a host device and a SD card according to the source synchronous system.

FIG. 13 is a block circuit diagram illustrating a host device and a SD card according to the common clock turn-around system.

DETAILED DESCRIPTION OF THE INVENTION

Figure 1:
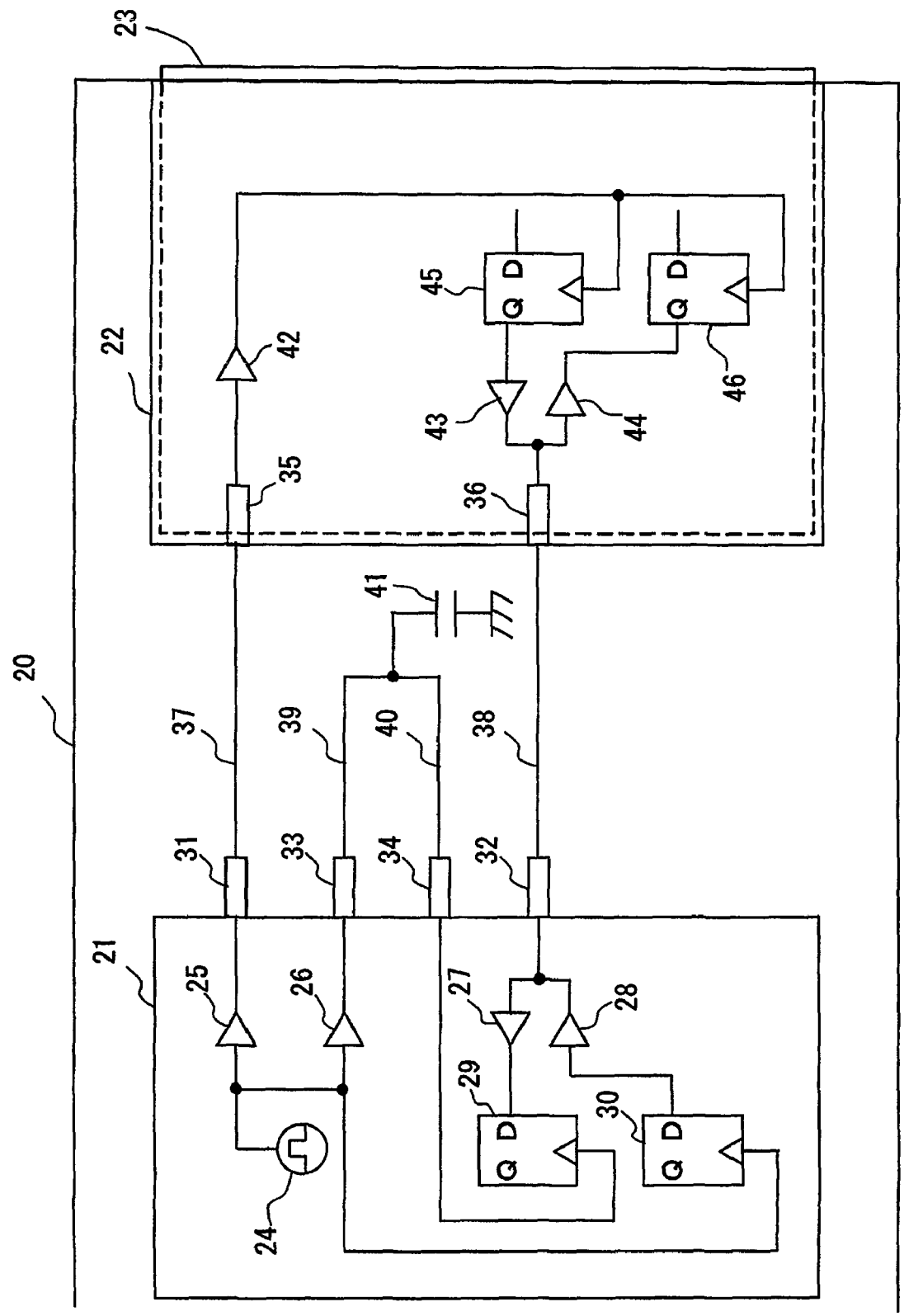
FIG. 1 is a block circuit diagram illustrating a host device and a card loaded in the host device according to a preferred embodiment of the present invention.

Hereinafter, preferred embodiments of the present invention are described referring to the drawings.

First Preferred Embodiment

Figure 2A:
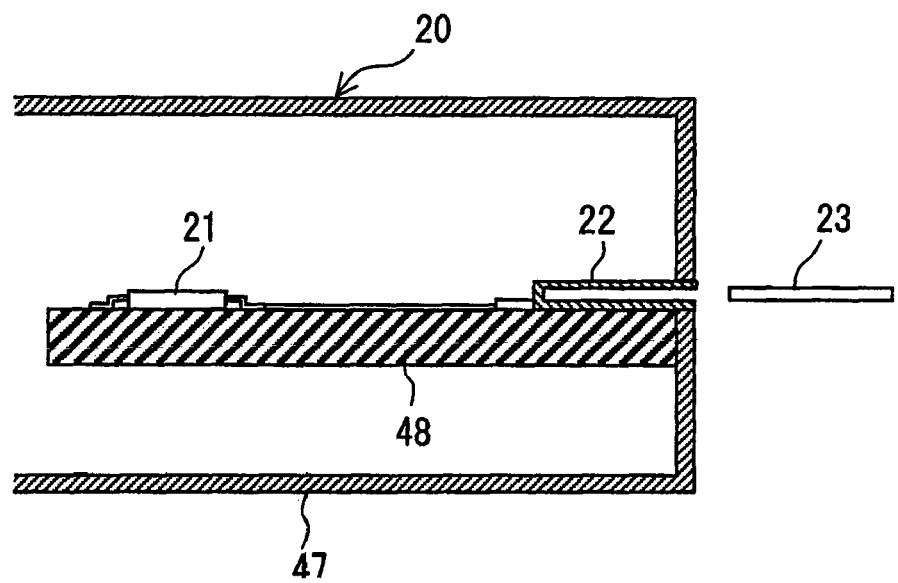
FIG. 2A is a schematic view illustrating a sectional structure of a side surface of the host device.
Figure 2B:
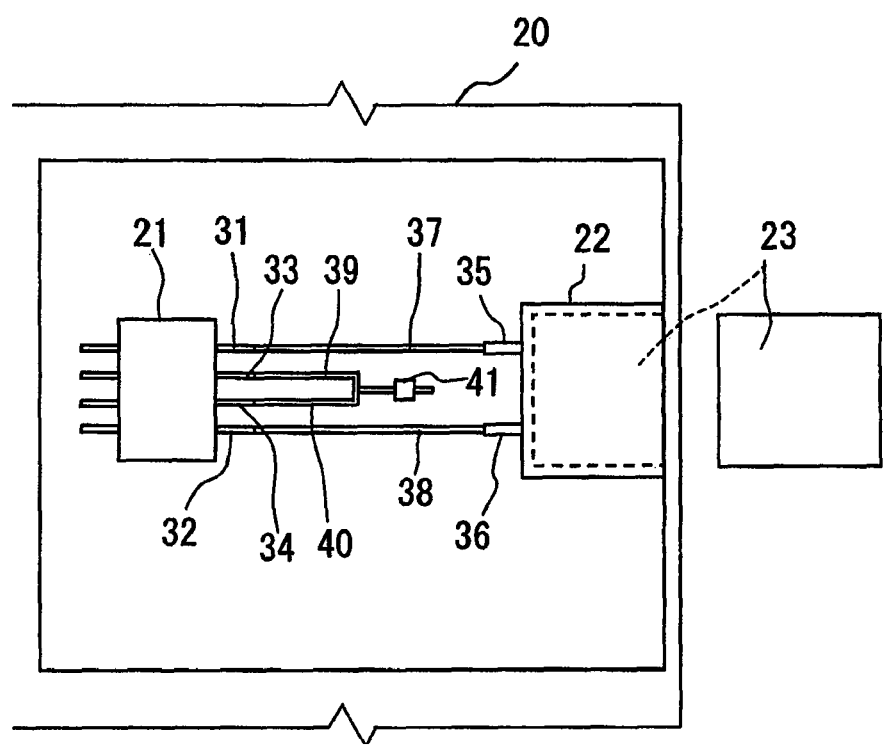
FIG. 2B is a schematic view illustrating a structure of a planar surface of the host device.

Hereinafter, a host device, in which a data-readable card according to preferred embodiments of the present invention is removably loaded, is described referring to the accompanied drawings. FIG. 1 is a block circuit diagram illustrating a host device and a recording card loaded in the host device, and FIGS. 2A and 2B are respectively a sectional side view and a planar view schematically illustrating the host device.

A host device 20 comprises a card controller 21 and a socket 22. A SD card 23, which is an example of a recording card, is inserted and loaded in the socket 22 as illustrated in a broken line. An LSI (semiconductor integrated circuit) constitutes the card controller 21. The card controller 21 comprises a reference clock generator 24, buffers 25-28, a read-only D flip-flop 29, and a write-only D flip-flop 30. The card controller 21 comprises first-fourth terminals 31-34. The card controller 21 comprises terminals other than first-fourth terminals 31-34, which, however, are not illustrated and described in the present preferred embodiment.

The socket 22 comprises socket first and second terminals 35 and 36 to be connected to card terminals (not shown) of the SD card 23. The socket 22 comprises terminals to be connected to the SD card 23 other than the socket first and second terminals 35 and 36, which, however, are not illustrated and described in the present preferred embodiment.

The controller first terminal 31 and the socket first terminal 35 are connected to each other by a main transmission wiring 37, and the controller second terminal 32 and the socket second terminal 36 are connected to each other by a data transmission wiring 38. An outgoing transmission wiring 39 which withdraws a read clock from the card controller is connected to the controller third terminal 33. An incoming transmission wiring 40 which retrieves the read clock withdrawn from the card controller 21 by the outgoing transmission wiring 39 into the card controller 21 is connected to the controller fourth terminal 34. An edge of the outgoing transmission wiring 39 and an edge of the incoming transmission wiring 40 are connected to each other, and a capacitor 41 is connected to a connection wiring 50 which connects the two wirings 39 and 40 to each other at a turn-around point thereof. The capacitor 41 has a load (capacitance) equal to that of the SD card 23 in the case where the SD card 23 is regarded as a load of the card controller 21. The main transmission wiring 37, outgoing transmission wiring 39 and incoming transmission wiring 40 constitute a clock transmission wiring.

The host device 20 comprises a substrate 48 within its housing 47 as illustrated in FIGS. 2A and 2B. The card controller 21 and the socket 22 are mounted on the substrate 48. The socket 22 is provided at the housing 47.

The SD card 23 comprises buffers 42-44, a read-only D flip-flop 45 and a write-only D flip-flop 46. Terminals of the SD card 23 are not shown.

Below is described an operation in the case where the SD card 23 is loaded in the socket 22 and data is read from the loaded SD card 23 according to the present preferred embodiment thus constituted.

A reference clock generated by the reference cock generator 24 of the card controller 21 is inputted to a clock input terminal of the D flip-flop 45 as a read clock for card use via the buffer (driver) 25, card controller first terminal 31, main transmission wiring 37, socket first terminal 35 and buffer (receiver) 42. In response to the read clock for card use inputted to the clock input terminal of the D flip-flop 45, the SD card 23 inputs data to a data input terminal D of the read-only D flip-flop 29 via the buffer 43, socket second terminal 36, data transmission wiring 38, controller second terminal 32 and buffer 27. The buffer 44 and D flip-flop 46 of the SD card 23, and the D flip-flop 30 and the buffer 28 of the card controller 21 are used for writing data, and they are not described in the present preferred embodiment.

The reference clock generated by the reference clock generator 24 is inputted to a clock input terminal of the read-only D flip-flop 29 of the card controller 21 as a read clock for controller use via the controller third terminal 33, outgoing transmission wiring 39, incoming transmission wiring 40 and controller fourth terminal 34. The capacitor 41 is connected to a connecting point where the outgoing transmission wiring 39 and the incoming transmission wiring 40 are connected to each other. A capacitance of the capacitor 41 corresponds to the load of the SD card 23.

Below are described the outgoing transmission wiring 39, incoming transmission wiring 40 and capacitor 41. The main transmission wiring 37 and the data transmission wiring 38 are both provided in the host device 20, and a transmission delay amount of the reference clock (read clock for card use) transmitted in the main transmission wiring 37 and a transmission delay amount of the data transmitted in the data transmission wiring 38 are already measured and known. The outgoing transmission wiring 39 is provided for transmitting the read clock for card controller use. Therefore, a transmission delay mount of the reference clock (read clock for card controller use) transmitted in the outgoing transmission wiring 39 is set to be equal to a transmission delay amount of the read clock for card use transmitted in the main transmission wiring 37 in the present preferred embodiment. Further, a transmission delay mount of the reference clock (read clock for controller use) transmitted in the incoming transmission wiring 40 is set to be equal to the transmission delay amount of the data transmitted in the data transmission wiring 38.

The capacitance of the capacitor 41 connected to the connection wiring 50 which connects the outgoing transmission wiring 39 and the incoming transmission wiring 40 to each other is set to an impedance (load corresponding to that of a card) corresponding to an impedance of the SD card 23 as described earlier. Therefore, a circuit configuration thereby obtained is equivalent to a state which seems as if the SD card 23 was connected to the turn-around point between the outgoing transmission wiring 39 and the incoming transmission wiring 40. In the present preferred embodiment, a capacitance value of the capacitor 41 is set to a substantially intermediate value of capacitance values of the SD cards 23 regarded as various types of load capacitors, so that various types of SD cards are applicable to the present embodiment.

Figure 3:
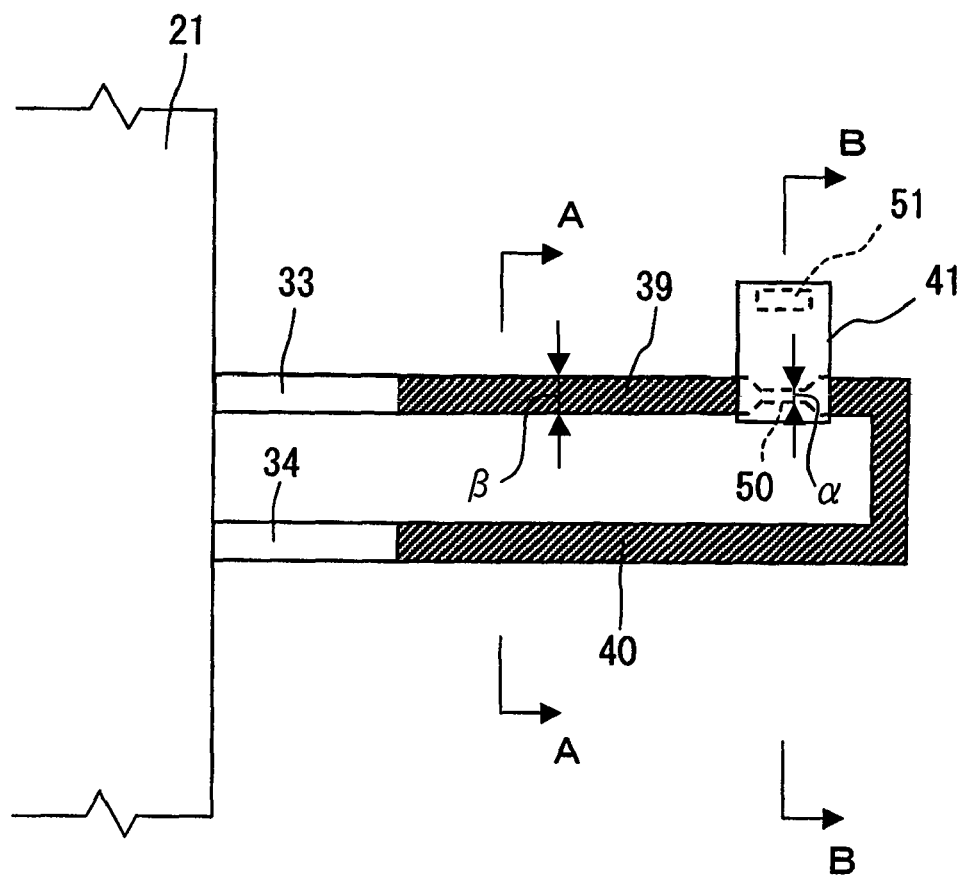
FIG. 3 is an enlarged view of a main section illustrated in FIG. 2B.
Figure 4:
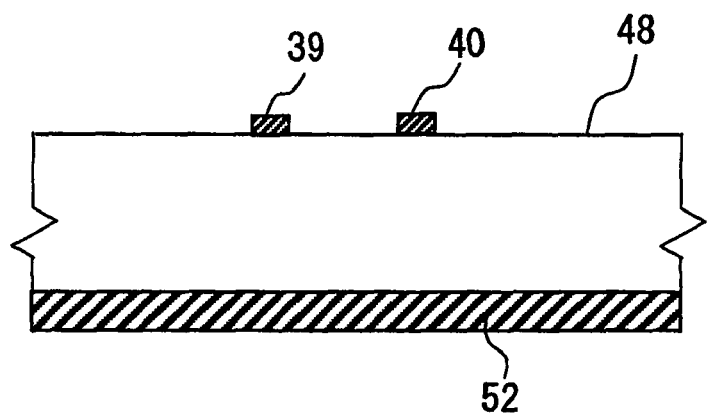
FIG. 4 is a sectional view cut along A-A line illustrated in FIG. 3.
Figure 5:
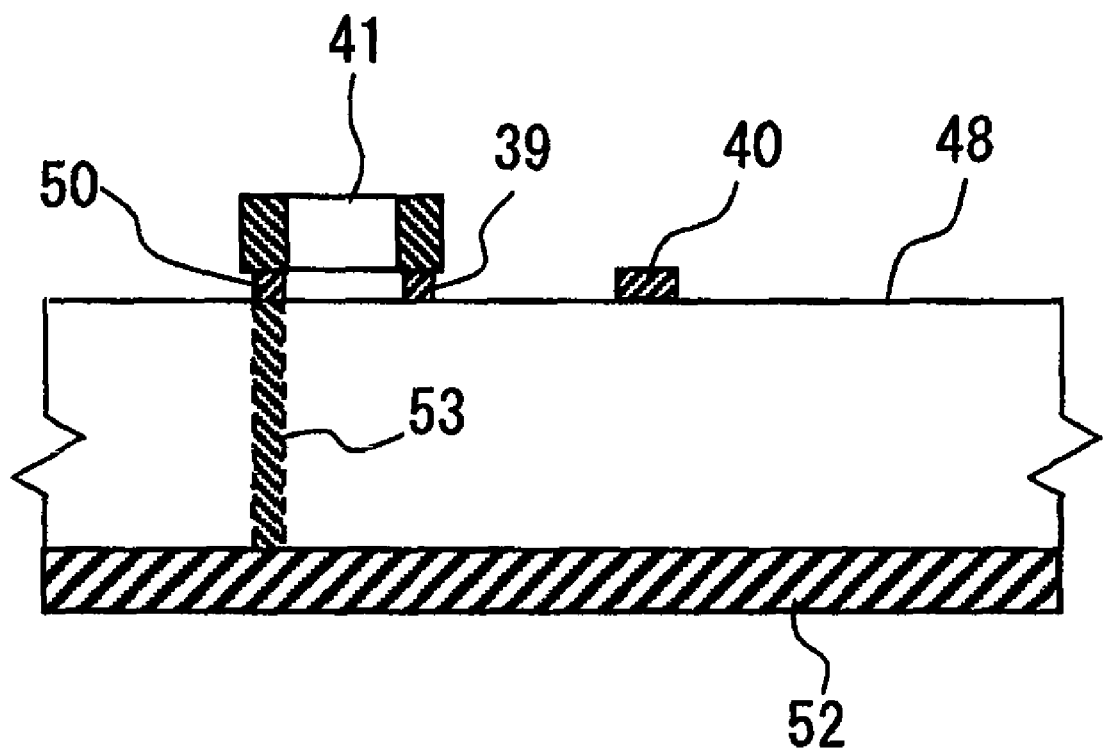
FIG. 5 is a sectional view cut along B-B line illustrated in FIG. 3.

FIG. 3 is a planar view of a circuit comprising the outgoing transmission wiring 39 and the incoming transmission wiring 40 in the card controller 21. FIG. 4 is a sectional view cut along A-A line illustrated in FIG. 3. FIG. 5 is a sectional view cut along B-B line illustrated in FIG. 3. As illustrated in FIGS. 3-5, a wiring width α of the connection wiring 50 is smaller than a wiring width β of the outgoing transmission wiring 39 and the incoming transmission wiring 40. A ground wiring 51 is provided in the vicinity of the connection wiring 50, and the capacitor 41 is provided such that the connection wiring 50 and the connection wiring 51 are connected to each other by the capacitor 41. The ground wiring 51 is connected to a ground wiring 52 provided on a rear surface of the substrate 48 via a conducive via hole 53 of the substrate 48.

Thus constituted, a characteristic impedance Z in the capacitor 41 is expressed by the following formula 1).

$$Z = \sqrt{(L/Ci)} \qquad 1), \text{wherein}$$

L denotes inductance component per unit length, and
Ci denotes capacitance and capacitance per unit length of the capacitor 41.

Thus, the characteristic impedance Z is expressed by the square root of (L/Ci). Because the wiring width α of the connection wiring 50 is set to be smaller than the wiring width β of the outgoing transmission wiring 39 and the incoming transmission wiring 40 so that a resistance value of the connection wiring 50 is increased, a high-frequency impedance in the GHz band by the capacitance Ci of the capacitor 41 is increased. Accordingly, the characteristic impedance Z is reduced, and the impedance matching is realized between the outgoing transmission wiring 39 and the incoming transmission wiring 40 at the turn-around point between the wirings 39 and 40 (more specifically, connection wiring 50), and the reflection of the read clock therein can be adjusted to substantially zero.

Below is specifically described a method of the impedance matching at the turn-around point (connection wiring 50). In order to realize the impedance matching at the turn-around point, a characteristic impedance Zleft in the state where the capacitor 41 is connected to the connection wiring 50 is simply caused to be equal to a characteristic impedance Zu in the outgoing transmission wiring 39 and the incoming transmission wiring 40.

The characteristic impedance Zleft can be calculated by the formula 2).

$$Zleft = \sqrt{(Ll/(Cl+Ci/\text{Pitch}))} \qquad 2), \text{wherein}$$

Ll denotes inductance generated in the connection wiring 50,
Cl denotes capacitance generated in the connection wiring 50,
Ci denotes the capacitance of the capacitor 41, and
Pitch denotes a wire length of the connection wiring 50.

The characteristic impedance Zu can be calculated by the formula 3).

$$Zu = \sqrt{(Lu/Cu)} \qquad 3), \text{wherein}$$

Lu denotes inductance generated in the outgoing transmission wiring 39 and the incoming transmission wiring 40, and
Cu denotes capacitance generated in the outgoing transmission wiring 39 and the incoming transmission wiring 40.

Therefore, based on the assumption that prescribed values are set as the inductances Ll and Lu and the capacitances Cl, Cu and Ci in advance, the wire length Pinch is set in the present embodiment so as to satisfy the formula 4) in order for the characteristic impedance Zleft and the characteristic impedance Zu to be equal to each other.

$$Zu = Zleft = \sqrt{[Ll/(Cl+Ci/\text{Pitch})]} \qquad 4)$$

Figure 6A:
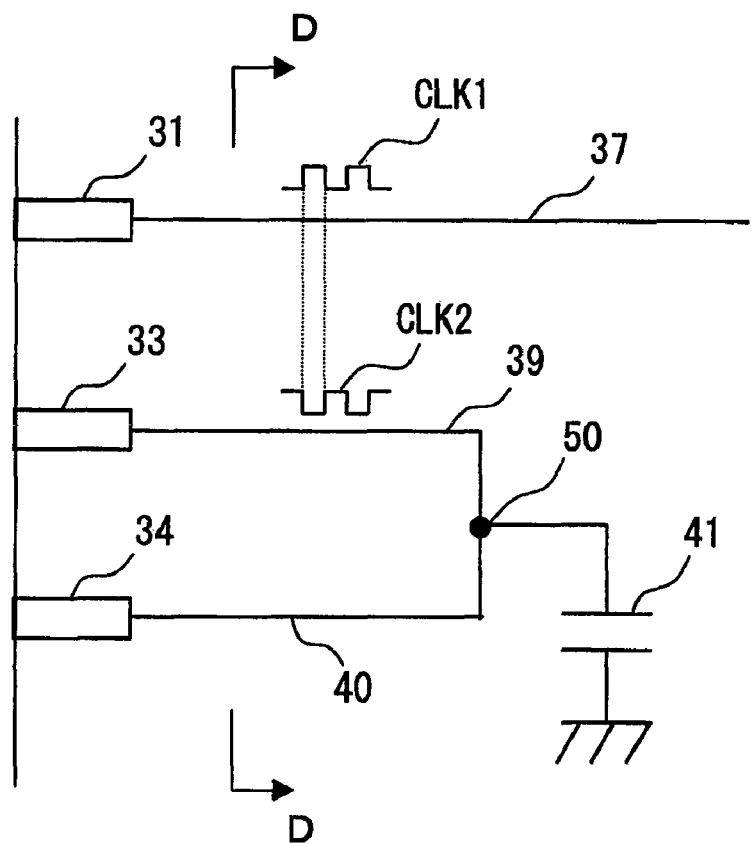
FIG. 6A is an enlarged view of a main section of a host device according to another preferred embodiment of the present invention viewed from a planar surface thereof.
Figure 6B:
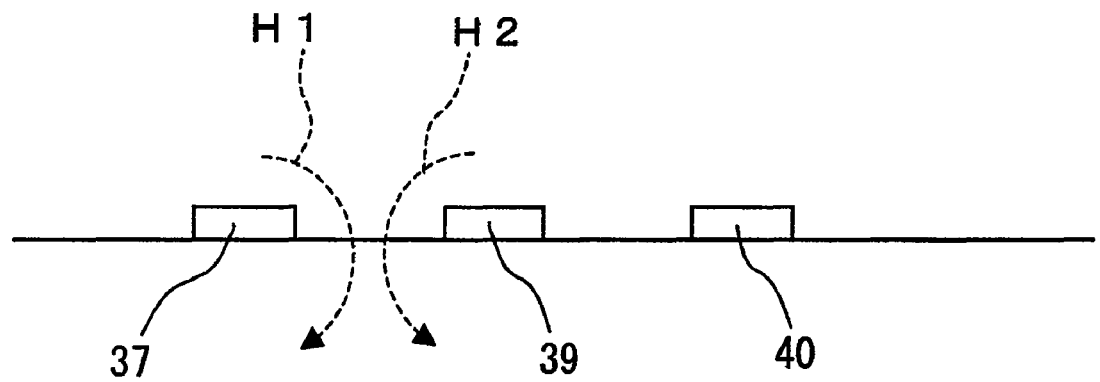
FIG. 6B is a sectional view cut along D-D line illustrated in FIG. 6A for describing an action of a magnetic field.

The present preferred embodiment is further described below. In the present preferred embodiment, as illustrated in FIG. 6A, the main transmission wiring 37 and the outgoing transmission wiring 39 are provided substantially in parallel with each other, and clocks CLK1 and CLK2 between the two transmission wirings 37 and 39 are phase-shifted relative to each other through 180 degrees. Accordingly, as illustrated in FIG. 6B (sectional view cut along D-D illustrated in FIG. 6A), a magnetic field H1 generated in the periphery of the wiring 37 resulting from a current flowing in the main transmission wiring 37 and a magnetic field H2 generated in the periphery of the wiring 39 resulting from a current flowing in the outgoing transmission wiring 39 cancel each other out. As a result, an electromagnetic radiation noise, generally called EMI (electromagnetic Interference), generated by high-frequency currents respectively flowing in the wirings 37 and 39 can be controlled.

Figure 7A:
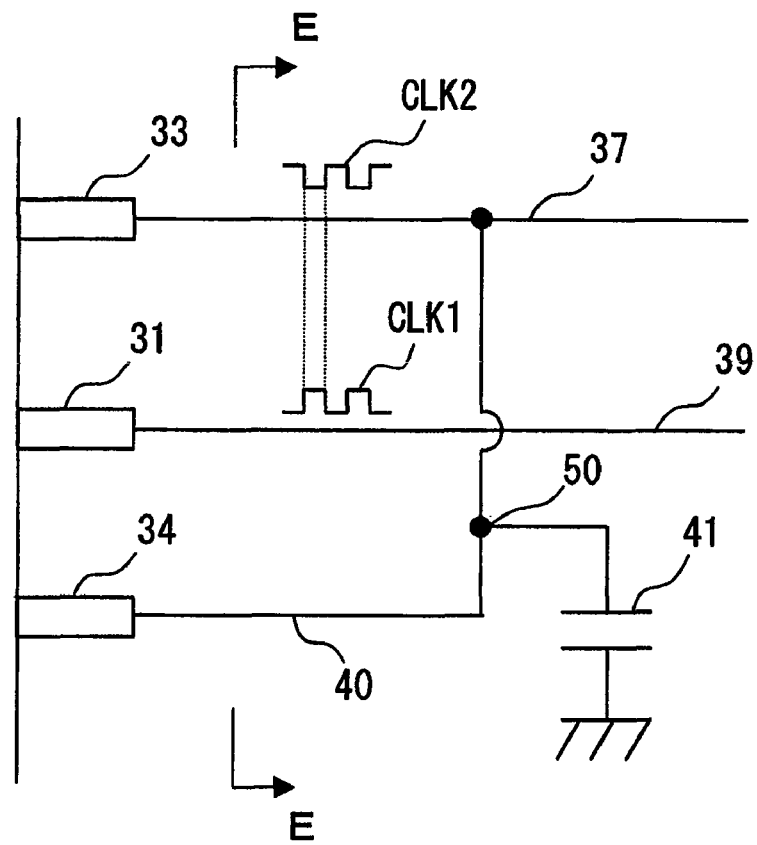
FIG. 7A is an enlarged view of a main section of a host device according to still another preferred embodiment of the present invention viewed from a planar surface thereof.
Figure 7B:
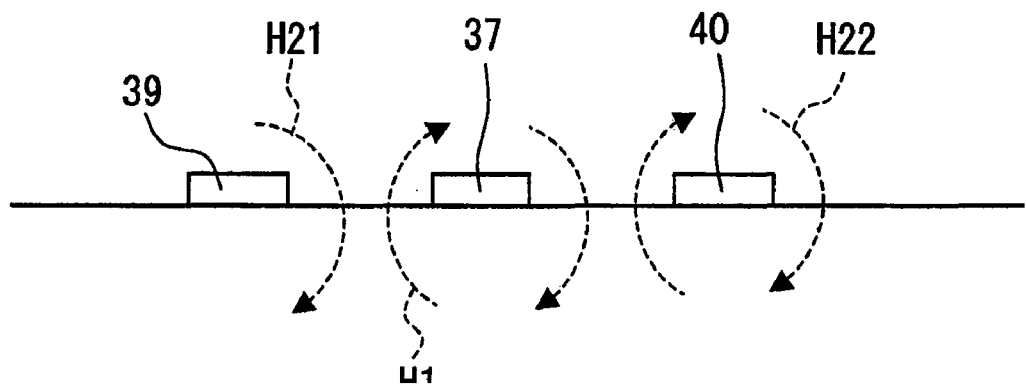
FIG. 7B is a sectional view cut along E-E line illustrated in FIG. 7A for describing an action of a magnetic field.

Further, according to the present preferred embodiment, as illustrated in FIG. 7A, the main transmission wiring 37 is provided between the outgoing transmission wiring 39 and the incoming transmission wiring 40 substantially in parallel with these wirings, and a clock transmitted in the main transmission wiring 37 and a clock transmitted in the outgoing transmission wiring 39 and the incoming transmission wiring 40 are phase-shifted relative to each other through 180 degrees. Accordingly, as illustrated in FIG. 7B (sectional view cut along E-E illustrated in FIG. 7A), the magnetic field H1 generated in the periphery of the main transmission wiring 37 resulting from the current flowing in the wiring 37 and a magnetic field H21 generated in the periphery of the outgoing transmission wiring 39 resulting from the current flowing in the wiring 39 cancel each other out. In a similar manner, the magnetic field H1 generated in the periphery of the main transmission wiring 37 resulting from the current flowing in the wiring 37 and a magnetic field H22 generated in the periphery of the incoming transmission wiring 40 resulting from a current flowing in the wiring 40 cancel each other out. As a result, the electromagnetic radiation noise generated by the high-frequency currents respectively flowing in the wirings 37, 39 and 40 can be controlled.

Figure 8:
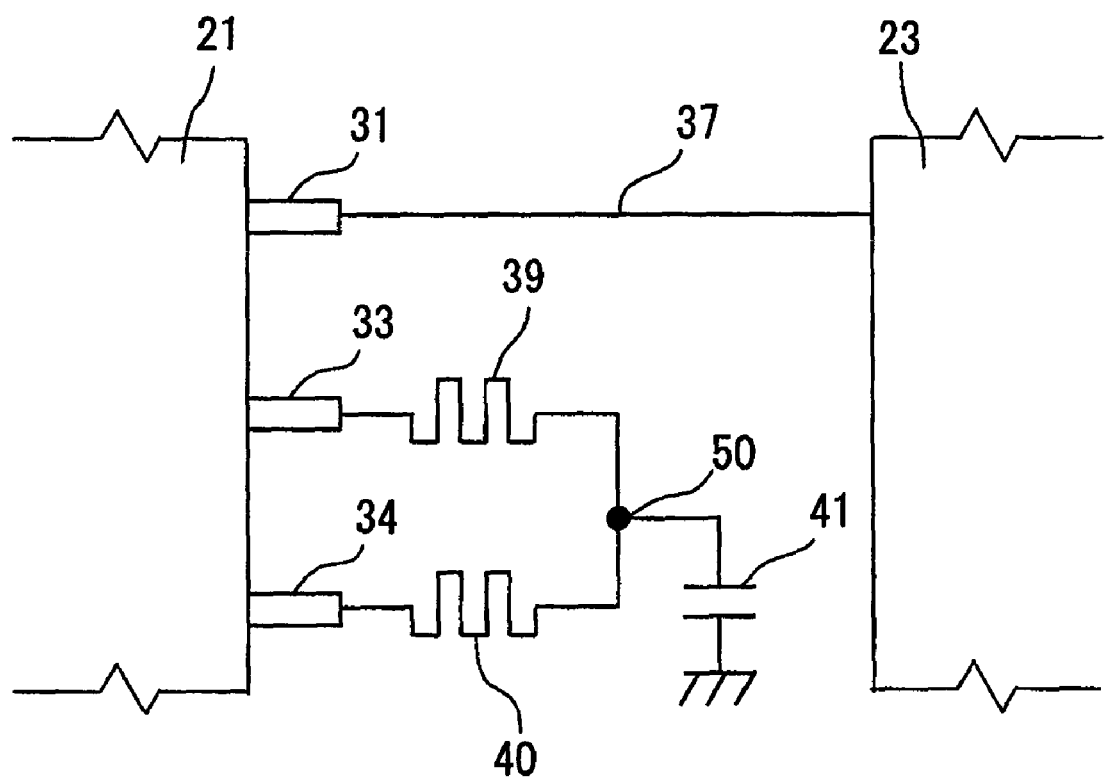
FIG. 8 is an enlarged view of a main section of a host device according to still another preferred embodiment of the present invention viewed from a planar surface thereof.

Further, according to the present preferred embodiment, as illustrated in FIG. 8, a meander resistor is provided in each of the outgoing transmission wiring 39 and the incoming transmission wiring 40. Accordingly, it becomes unnecessary to extend the outgoing transmission wiring 39 and the incoming transmission wiring 40 to the vicinity of the socket 23 and then turn them around.

Figure 9A:
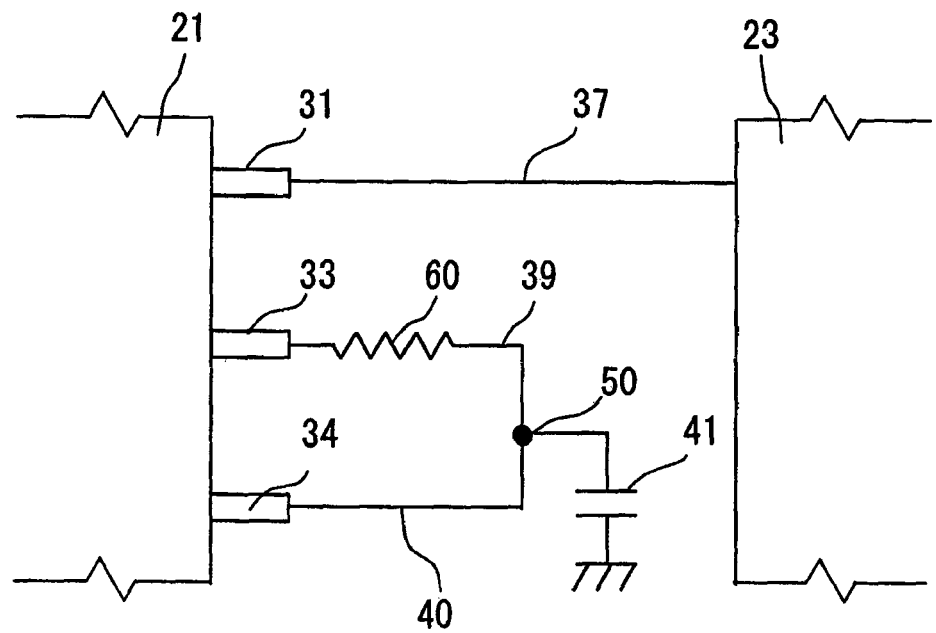
FIG. 9A is an enlarged view of a main section of a host device according to still another preferred embodiment of the present invention viewed from a planar surface thereof.

Further, according to the present preferred embodiment, as illustrated in FIG. 9A, a dumping resistor is provided in the outgoing transmission wiring 39. Accordingly, in the case where some impedance mismatch is generated at the connection point between the outgoing transmission wiring 39 and the incoming transmission wiring 40 (turn-around point), influences of the reflection of signals thereby generated can be reduced.

Figure 9B:
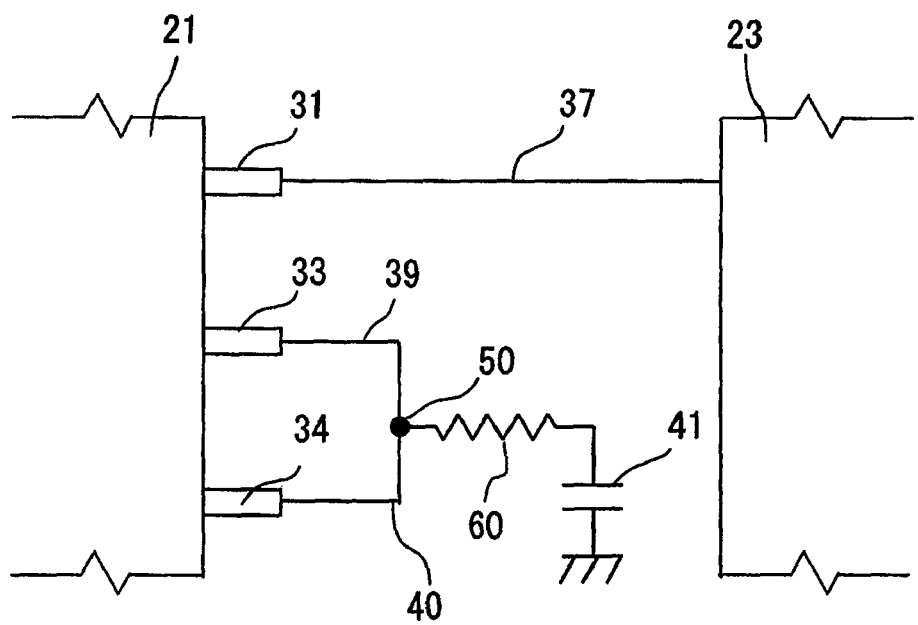
FIG. 9B is an enlarged view of a main section of a host device according to still another preferred embodiment of the present invention viewed from a planar surface thereof.
Figure 10:
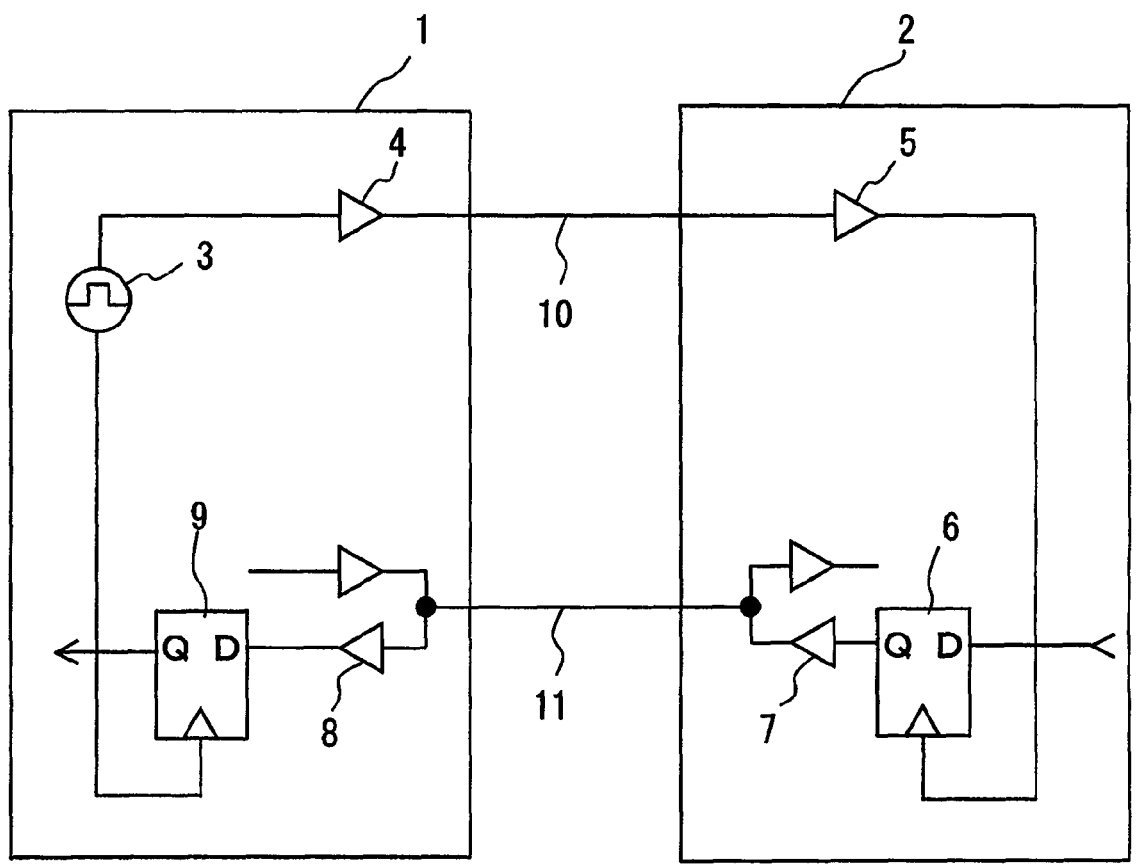
FIG. 10 is a block circuit diagram illustrating a host device and a SD card according to a conventional technology.

Further, according to the present preferred embodiment, as illustrated in FIG. 9B, an inductance 90 is provided in the connection wiring 50. Accordingly, in the case where some impedance mismatch is generated at the connection point between the outgoing transmission wiring 39 and the incoming transmission wiring 40, influences of the reflection of signals thereby generated can be reduced.

As thus far described, according to the present preferred embodiment:

The clock phase shift generated by the transmission of the read clock in the main transmission wiring 37 is absorbed by the outgoing transmission wiring 39 provided in the host device 20.

The clock phase shift generated by the transmission of the data in the data transmission wiring 38 is absorbed by the incoming transmission wiring 40 provided in the host device 20.

The variation of the clock phase shifts generated in accordance with the load impedance of the inserted SD card 23 is absorbed by providing the capacitor 41 having the capacitance (load) corresponding to the load of the SD card 23 in the connection wiring 50.

As a result, according to the present preferred embodiment:

The skew generated between the clock and the data can be controlled, and the data can be thereby transmitted fast.

Such fast data transmission can be realized without any additional pin terminals on the card side used to send the source clock to the host device 20.

Such problems as the deterioration of a data quality and the deterioration of connectivity due to the disturbance of a waveform of the read clock, which were a bottleneck in the fast data transmission, can be solved.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A host device comprising:
a reference clock generator configured to generate a read clock;
a socket in which a recording card is removably loaded so that a signal can be thereby received and transmitted;
a card controller configured to transmit the read clock to the socket and receiving via the socket data transmitted in synchronization with the read clock by the recording card which receives the read clock via the socket;
a clock transmission wiring configured to transmit the read clock; and
a data transmission wiring configured to transmit the data, wherein the clock transmission wiring comprises:
a main transmission wiring configured to transmit the read clock from the card controller to the socket;
an outgoing transmission wiring configured to withdraw the read clock from the card controller; and
an incoming transmission wiring configured to retrieve the read clock withdrawn from the card controller by the outgoing transmission wiring into the card controller, and
a transmission delay amount of the outgoing transmission wiring is set to be equal to a transmission delay amount of the main transmission wiring,
a transmission delay amount of the incoming transmission wiring is set to be equal to a transmission delay amount of the data transmission wiring, and
the card controller receives the data transmitted by the recording card in synchronization with the read clock retrieved by the incoming transmission wiring.

2. The host device as claimed in claim 1, wherein
the card controller comprises a controller first terminal, a controller second terminal, a controller third terminal and a controller fourth terminal, and
the socket comprises a socket first terminal and a socket second terminal, and
the main transmission wiring is connected to the controller first terminal and the socket first terminal,
the data transmission wiring is connected to the controller second terminal and the socket second terminal, the outgoing transmission wiring is connected to the controller third terminal, and the incoming transmission wiring is connected to the controller fourth terminal.

3. The host device as claimed in claim 1, wherein a load regarded as a load of the card controller equal to a load of the recording card is connected to a turn-around point between the outgoing transmission wiring and the incoming transmission wiring.

4. The host device as claimed in claim 3, wherein the load is a capacitor.

5. The host device as claimed in claim 3, wherein a wiring width at the turn-around point is smaller than a wiring width of the outgoing transmission wiring and a wiring width of the incoming transmission wiring.

6. The host device as claimed in claim 1, wherein the main transmission wiring and the outgoing transmission wiring are provided substantially in parallel with each other, and a phase of the read clock transmitted in the main transmission wiring and a phase of the read clock transmitted in the outgoing transmission wiring are shifted in relation to each other through 180 degrees.

7. The host device as claimed in claim 1, wherein the main transmission wiring, the outgoing transmission wiring and the incoming transmission wiring are provided substantially in parallel with one another, and the main transmission wiring is provided between the outgoing transmission wiring and the incoming transmission wiring, and a phase of the read clock transmitted in the main transmission wiring and a phase of the read clock transmitted in the outgoing transmission wiring are shifted in relation to each other through 180 degrees, and the phase of the read clock transmitted in the main transmission wiring and a phase of the read clock transmitted in the incoming transmission wiring are shifted in relation to each other through 180 degrees.

8. The host device as claimed in claim 5, wherein a connection wiring which connects the outgoing transmission wiring and the incoming transmission wiring to each other is provided at the turn-around point, and a dumping resistor or an inductance is connected to any one of the outgoing transmission wiring, the incoming transmission wiring and the connection wiring.

9. The host device as claimed in claim 1, wherein an SD card is used as the recording card.

\* \* \* \* \*